(12) United States Patent
Kyhl et al.

(10) Patent No.: US 11,852,805 B2
(45) Date of Patent: Dec. 26, 2023

(54) WAVE SCANNING OPTIC (71) Applicant: Raytheon Company, Waltham, MA (US)

(72) Inventors: Curtis Kyhl, Lewisville, TX (US); Mark Noethen, McKinney, TX (US)

(73) Assignee: Raytheon Company, Waltham, MA (US)

( * ) Notice: Subject to any disclaimer, the term of this patent is extended or adjusted under 35 U.S.C. 154(b) by 538 days.

(21) Appl. No.: 17/141,523

(22) Filed: Jan. 5, 2021

(65) Prior Publication Data
US 2022/0214540 A1 Jul. 7, 2022

(51) Int. Cl.
*G02B 26/10* (2006.01)
*G01S 7/481* (2006.01)
*G01S 17/08* (2006.01)
*G01S 17/89* (2020.01)

(52) U.S. Cl.
CPC .......... *G02B 26/101* (2013.01); *G01S 7/4817* (2013.01); *G01S 17/08* (2013.01); *G02B 26/105* (2013.01); *G01S 17/89* (2013.01)

(58) Field of Classification Search
None
See application file for complete search history.

(56) References Cited

U.S. PATENT DOCUMENTS

| | | | |
|---|---|---|---|
| 3,972,583 A | 8/1976 | Lobb | |
| 4,624,528 A | 11/1986 | Brueggemann | |
| 5,074,268 A | 12/1991 | Schatz et al. | |
| 5,392,149 A | 2/1995 | Boardman et al. | |
| 7,561,319 B2 | 7/2009 | Ishibe | |
| 8,172,411 B2 | 5/2012 | Wu et al. | |
| 8,679,102 B2* | 3/2014 | Reichert | A61N 5/0616 606/9 |
| 9,016,881 B2 | 4/2015 | Lambert | |
| 9,122,062 B2 | 9/2015 | Kim | |
| 9,188,674 B2 | 11/2015 | Suzuki et al. | |
| 9,195,061 B1 | 11/2015 | Benner, Jr. | |
| 10,436,937 B2* | 10/2019 | Anderton | G02B 26/108 |
| 10,466,439 B2 | 11/2019 | Yamaguchi | |
| 10,502,949 B2* | 12/2019 | Sapir | G02B 26/124 |
| 10,663,585 B2 | 5/2020 | McWhirter | |

* cited by examiner

*Primary Examiner* — Jennifer D. Carruth (74) *Attorney, Agent, or Firm* — Renner, Otto, Boisselle, & Sklar (57) ABSTRACT

A wave scanning optic is formed to have an angular reflectance or refraction that produces a uniform line scan during rotation of the optic, such that the optic is operable for seamless multidirectional scanning. The wave scanning optic includes a rotatable body defining a central axis of rotation about which the rotatable body rotates during scanning, and an optical surface formed on the rotatable body and having a wavy pattern defined by one or more lobes that protrude outwardly from the rotatable body. The optical surface has a continuous pattern with an angular frequency that varies along a radial distance from the central axis of rotation. The optical surface is configured to emit and/or receive light in one or more incident directions.

20 Claims, 5 Drawing Sheets

WAVE SCANNING OPTIC

FIELD OF DISCLOSURE

The disclosure relates to laser scanning optics.

DESCRIPTION OF THE RELATED ART

Various applications may use optical scanning systems to read and record information. Exemplary application include light or laser detection and ranging, i.e. LIDAR or LADAR, hyperspectral applications, industrial products, and consumer products, such as laser printers, laser bar code readers, etc. Optical scanning systems use scanning optics that are configured to direct a laser beam toward a target scan track. The scanning optics typically have precisely angled reflecting surfaces such that rotation of the optic will cause an incident light beam to be reflected by the reflecting surfaces.

Conventional scanning optics include rotating prisms and polygonal or faceted mirrors. In a rotating polygonal mirror, the point on each reflective surface, i.e. the facet, of the polygonal mirror where reflection of the light beam occurs is longitudinally shifted with respect to the light path of the incident beam as the polygonal mirror rotates. However, rotating prisms and polygonal mirrors may be deficient for some applications since rotating prisms and polygonal mirrors are limited to unidirectional scanning. Another deficiency of using rotating prisms and polygonal mirrors is that the scanning operation may include pauses between scanning surfaces. Using polygonal or faceted mirrors may also result in undesirable angles between the facets in the scanning direction, i.e. facet angle errors, or pyramidal errors.

Another prior attempt to provide a scanning optic includes using fast steering mirrors and oscillating mirrors which are advantageous in providing fast multidirectional scanning operation. However, fast steering mirrors and oscillating mirrors may experience pauses in scanning, such as during a change in direction. Still another disadvantage of fast steering mirrors and oscillating mirrors is that they require complex control and feedback loops.

SUMMARY OF THE DISCLOSURE

The present application provides a wave shaped surface scanning optic or optical component that is formed to have an angular reflectance or refraction of an optical surface that produces a uniform line scan during rotation of the optic, such that the optic is operable for continuous multidirectional scanning without breaks in the scan pattern. The wave scanning optic is formed as a compact, single optical structure including a rotatable body defining a central axis of rotation about which the rotatable body rotates during scanning, and an optical surface formed on the rotatable body and having a wavy pattern defined by one or more lobes that protrude outwardly from the rotatable body. The optical surface has a continuous sinusoidal pattern with an angular frequency that varies along a radial distance from the central axis of rotation. The optical surface is configured to emit and/or receive light in one or more incident directions such that the wave scanning optic may be configured as both an emitter and a receiver.

The wave scanning optic is advantageous in providing a continuous and uniform line scan without complex control mechanisms. The amplitude and frequency of the sine wave optical surface pattern may be selected to achieve a predetermined scanning operation in one or more incident directions, i.e. the waviness of the optical surface pattern is formed to control the scanning angle range. Advantageously, facet angle errors and pyramidal errors are eliminated due to the pattern of the wavy optical surface for the wave scanning optic, in contrast to using conventional polygonal or faceted mirrors.

The pattern of the optical surface may also be used to achieve a desired rate of scanning. The scanning rate for the wave scanning optic may be increased by increasing the speed of rotation of the rotatable optic and/or by increasing the number of lobes formed on the rotatable body. One or more lobes may be provided. The wave scanning optic may have any suitable shape, such as a flat and wavy washer-like shape, or a cylinder.

According to an aspect of the disclosure, a wave scanning optic may include a wavy optical surface.

According to an aspect of the disclosure, a wave scanning optic may include one or more lobes.

According to an aspect of the disclosure, a wave scanning optic may be configured to provide multidirectional scanning during rotation of the wave scanning optic.

According to an aspect of the disclosure, a wave scanning optic may have an optical surface having a pattern that is formed as a radially-dependent sine wave period.

According to an aspect of the disclosure, a wave scanning optic may be formed to provide a continuous and uniform line scan during rotation of the wave scanning optic.

According to an aspect of the disclosure, a wavy optical surface of a wave scanning optic may be formed to provide a specific scanning operation.

According to an aspect of the disclosure, a scanning optic includes a rotatable body defining a central axis of rotation about which the rotatable body rotates during scanning, and an optical surface formed on the rotatable body and having a wavy pattern defined by one or more lobes that protrude outwardly from the rotatable body.

According to an embodiment in accordance with any paragraph(s) of this summary, the optical surface may have a continuous sinusoidal pattern with an angular frequency that varies along a radial distance from the central axis of rotation.

According to an embodiment in accordance with any paragraph(s) of this summary, the optical surface may be configured to emit and/or receive light in one or more incident directions.

According to an embodiment in accordance with any paragraph(s) of this summary, the one or more incident directions may correspond to points of impact of light that is emitted from or received on the optical surface as the rotatable body rotates during scanning.

According to an embodiment in accordance with any paragraph(s) of this summary, points of impact along any spoke of radial distance relative to the central axis of rotation are configured to provide a same scanning angle.

According to an embodiment in accordance with any paragraph(s) of this summary, the optical surface may be configured to emit and/or receive light over multiple paths simultaneously.

According to an embodiment in accordance with any paragraph(s) of this summary, the one or more incident directions include a horizontal direction, a vertical direction, and a diagonal direction between the horizontal direction and the vertical direction.

According to an embodiment in accordance with any paragraph(s) of this summary, the optical surface may be configured to both emit and receive light.

According to an embodiment in accordance with any paragraph(s) of this summary, an angular reflectance or refraction of the optical surface may provide a uniform line scan during rotation of the rotatable body.

According to an embodiment in accordance with any paragraph(s) of this summary, the continuous pattern may be periodic or aperiodic.

According to an embodiment in accordance with any paragraph(s) of this summary, the rotatable body may have a washer shape.

According to an embodiment in accordance with any paragraph(s) of this summary, the rotatable body may be cylindrical in shape.

According to an embodiment in accordance with any paragraph(s) of this summary, the one or more lobes may include a plurality of lobes.

According to an embodiment in accordance with any paragraph(s) of this summary, the scanning optic may be formed of a plurality of scanned refractive optical surfaces.

According to an embodiment in accordance with any paragraph(s) of this summary, the scanning optic may be arranged in a laser radar.

According to another aspect of the disclosure, a laser radar includes a rotatable optic defining a central axis of rotation about which the rotatable optic rotates during scanning, and an optical surface formed on the rotatable optic and having a wavy pattern with one or more lobes that protrude outwardly from the rotatable optic, the optical surface being configured to emit and/or receive light in one or more incident directions, and the optical surface having an angular reflectance or refraction that provides a uniform line scan during rotation of the rotatable optic.

According to still another aspect of the disclosure, a method of scanning includes rotating a rotatable optic about a central axis of rotation, the rotatable optic having an optical surface formed thereon that has a wavy pattern with one or more lobes that protrude outwardly from the rotatable optic, and emitting and/or receiving light in one or more incident directions.

According to an embodiment in accordance with any paragraph(s) of this summary, the method may include increasing a scan rate of the rotatable optic by at least one of increasing a number of the one or more lobes or increasing a speed of rotation of the rotatable optic.

According to an embodiment in accordance with any paragraph(s) of this summary, the method may include emitting and/or receiving light over multiple paths simultaneously.

According to an embodiment in accordance with any paragraph(s) of this summary, the method may include providing a uniform line scan during rotation of the rotatable optic via an angular reflectance or refraction of the optical surface.

To the accomplishment of the foregoing and related ends, the disclosure comprises the features hereinafter fully described and particularly pointed out in the claims. The following description and the annexed drawings set forth in detail certain illustrative embodiments of the disclosure. These embodiments are indicative, however, of but a few of the various ways in which the principles of the disclosure may be employed. Other objects, advantages and novel features of the disclosure will become apparent from the following detailed description of the disclosure when considered in conjunction with the drawings.

BRIEF DESCRIPTION OF DRAWINGS

The annexed drawings, which are not necessarily to scale, show various aspects of the disclosure.

DETAILED DESCRIPTION

The principles described herein have application in any application that requires scanning, and in particular, line scanning. Light or laser detection and ranging, i.e. LIDAR or LADAR, and other hyperspectral applications may implement the wave scanning optic described herein. Various industrial and consumer products may implement the wave scanning optic described herein, such as laser beam scanners used in laser printers, laser bar code readers, etc. Still many other applications may be suitable.

Figure 1:
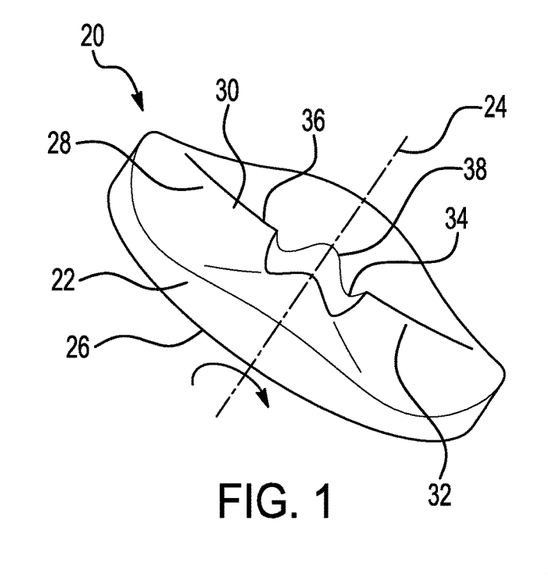
FIG. 1 shows a wave scanning optic according to an exemplary embodiment of the present disclosure in which an optical surface of the wave scanning optic has a wavy pattern defined by a plurality of lobes.

Referring first to FIG. 1, a wave scanning optic 20 according to an exemplary embodiment of the present disclosure is shown. The wave scanning optic 20 includes a rotatable body 22 that defines a central axis of rotation 24 about which the rotatable body 22 rotates during scanning. The rotatable body 22 may be formed as a flat disc-shaped body having a surface 26. The wave scanning optic 20 may be rotated by a motor or any other suitable drive mechanism during the scanning operation.

An optical surface 28 is formed on the rotatable body 22 opposite the surface 26 and is formed of a plurality of scanned reflective or refractive optical surfaces. For example, in exemplary embodiments, the wave scanning optic 20 may be a reflective element or mirror, and in other embodiments, the wave scanning optic 20 may be a refractive element or lens. The optical surface 28 has a wavy pattern defined by one or more curved surfaces or lobes 30, 32 that protrude outwardly from the rotatable body 22. For example, the lobes 30, 32 may protrude in a direction that is normal to the surface 26 and parallel with the central axis of rotation 24. Any number of lobes 30, 32 may be provided, such as one or more lobes 30, 32. FIG. 1 shows an exemplary embodiment in which the optical surface 28 includes four lobes 30, 32, but fewer than four or more than four lobes may be provided to achieve a desired scanning operation.

The surface 26 may be planar or in other exemplary embodiments, the surface 26 may also have a wavy pattern that is the same or different as compared with the pattern of the optical surface 28. If the wave scanning optic 20 is configured to be a refractive element, then both the optical surface 28 and the surface 26 may be wavy to produce a desired scanning pattern as light passes through the wave scanning optic 20 functioning as a lens. In other exemplary embodiments in which the wave scanning optic 20 is configured to be a mirror, both the wavy optical surface 28 and the surface 26 may be configured to emit and/or receive light.

Each lobe 30, 32 has a height that extends from a valley 34, i.e. a shallowest point of the optical surface 28, to a peak 36 of the lobe 30, 32, a highest point of the optical surface 28, such that the optical surface 28 has a periodic pattern with periods defined by the arcuate distance between the peaks 36 of the lobes 30, 32. The peak 36 may extend as a ridge in the radial direction. In other exemplary embodiments, the optical surface 28 may have an aperiodic pattern. The height of the peaks 36, or amplitude, and the distances between the peaks 36 and valleys 34 are formed to provide a certain scan angle. The peaks 36 and valleys 34 may be formed to be farther away from each other to provide different scan angles. The amplitudes may also be changed to provide different scan angles. The lobes 30, 32 may have a same shape or a varying shape as required for a particular scanning operation. In exemplary embodiments, the lobes 30, 32 may be equidistantly spaced. In other exemplary embodiments, the spacing between the lobes 30, 32 may be varied.

The optical surface 28 is a single and continuous 360-degree surface that is configured to provide uninterrupted scanning as the rotatable body 22 is rotated about the central axis of rotation 24. The continuous surface is formed to have a freeform shape, such that the surface is curved and smooth without sharp points or sharply angled surfaces. The wave scanning optic 20 may have a flat washer-type shape with a radial aperture 38 arranged about the central axis of rotation 24. The shape of the wave scanning optic 20 may be symmetrical or non-symmetrical. Advantageously, the wave scanning optic 20 is formed as a single and compact optical component that is able to both emit and receive light.

The radial aperture 38 may have any suitable dimensions. In an exemplary embodiment, the radial width w of the rotatable body 22 from the radial aperture 38 to an outer perimeter 40 of the rotatable body 22 may be greater than a diameter of the radial aperture 38. Many other dimensions may be suitable. The wave scanning optic may be formed of any suitable materials and any suitable manufacturing method. The substrate or rotatable body 22 may be formed using additive manufacturing or any other suitable process. The optical surface 28 may be formed on the rotatable body 22 using diamond turning and diamond polishing, or any other suitable process.

Figure 2:
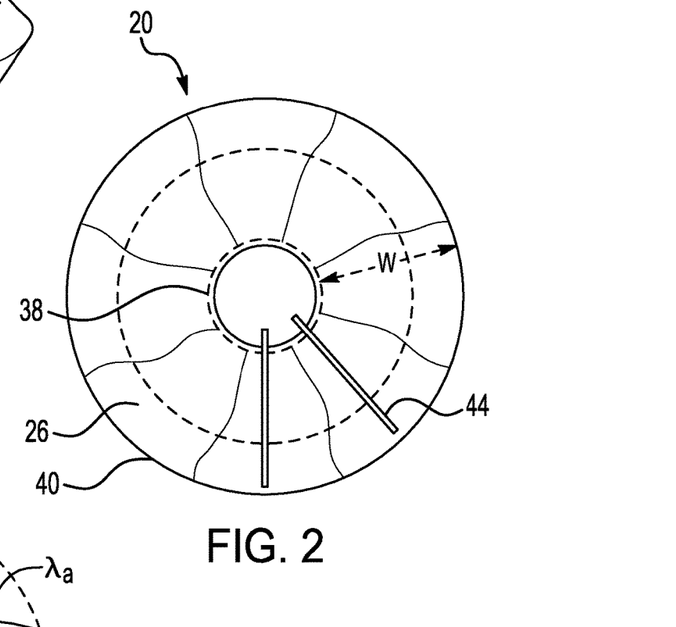
FIG. 2 shows a top view of the optical surface of the wave scanning optic of FIG. 1.
Figure 3:
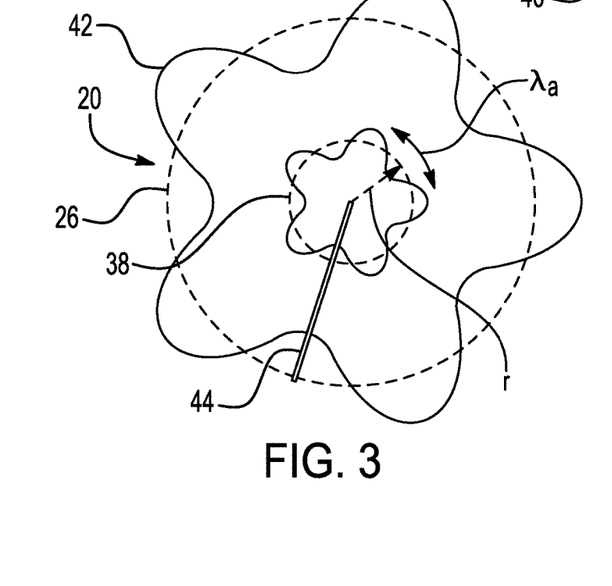
FIG. 3 shows a circular sine wave shape of the optical surface of the wave scanning optic of FIG. 1.

Referring in addition to FIGS. 2 and 3, the wavy pattern of the optical surface 28 is a sinusoidal pattern with an angular frequency that varies along the radial width w of the optical surface 28 from the central axis of rotation 24. The angular frequency corresponds to the number of lobes 30, 32. The pattern of the optical surface 28 is formed to produce a uniform line scan. FIG. 2 shows a top view of the optical surface 28 and FIG. 3 shows the pattern of the optical surface 28 being defined by a circular sine wave 42. As shown in FIG. 3, the surface slope sine wavelength, i.e. the angular wavelength $\lambda_a$ for the optical surface 28 is a function of the radius r of the radial aperture 38 such that the rotational angular frequency for the wave scanning optic acts as a constant with the radius r of the radial aperture 38. The wave scanning optic 20 may be reflective over all wavelength ranges. The angular wavelength $\lambda_a$ is equivalent to the angular frequency ω multiplied by the radius r. By way of the sinusoidal pattern of the optical surface 28, a line image 44 of the wave scanning optic 20 will have a same angle of reflection along its length, and will remain linear over the scan.

Figure 4:
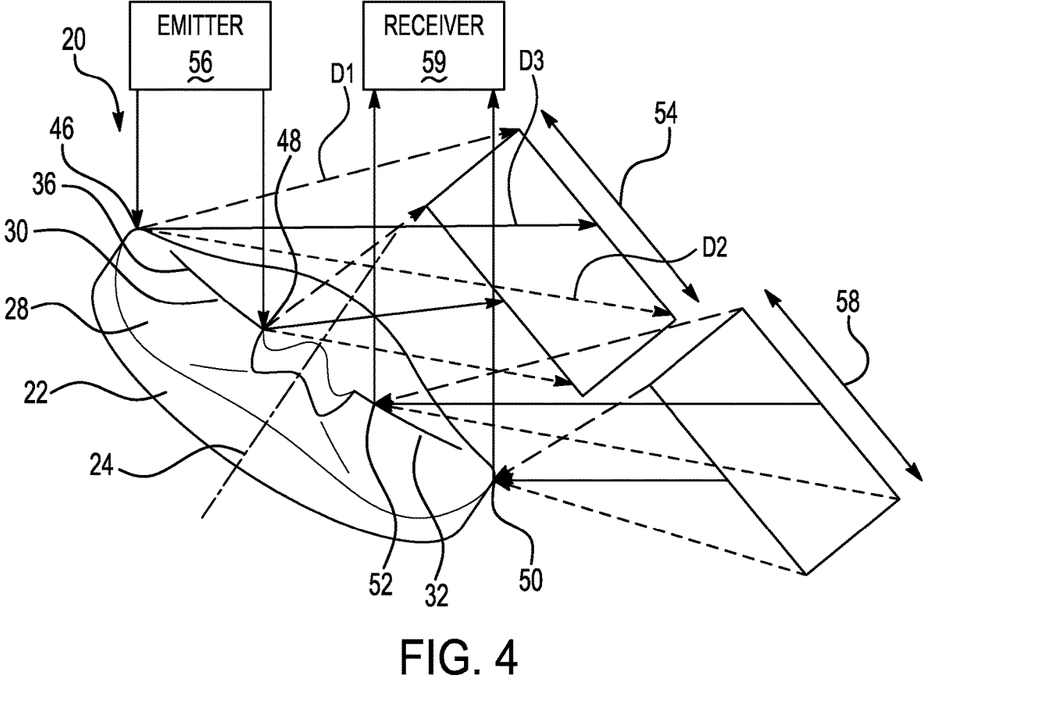
FIG. 4 shows the reflected line scanned beams provided during rotation of the wave scanning optic of FIG. 1.
Figure 5:
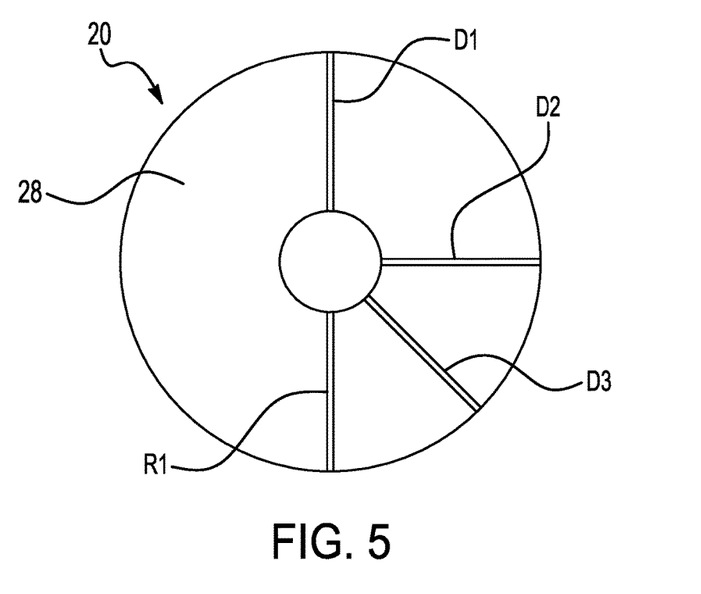
FIG. 5 shows the multiple incident line beams on the wave scanning optic of FIG. 1.

Referring now to FIGS. 4 and 5, operation of the wave scanning optic 20 is shown. By way of the wavy pattern of the optical surface 28, the wave scanning optic 20 is configured to emit and/or receive light in one or more incident directions. In exemplary embodiments, the optical surface 28 may be configured to emit and/or receive light over multiple paths simultaneously. The one or more incident directions correspond to points of impact 46, 48, 50, 52 of light that is emitted and/or received on the optical surface 28 during rotation of the rotatable body 22 about the central axis of rotation 24.

The points of impact 46, 48, 50, 52 may be formed on each of the lobes 30, 32. The radial length of the peak 36 of the corresponding lobe 30, 32 may define a spoke of the wave scanning optic 20 that extends from the aperture 38 to the outer perimeter of the rotatable body 22. In the exemplary embodiment shown in FIG. 4, a first lobe 30 may have one or more points of impact 46, 48 that are formed along the spoke defined by the first lobe 30 and a second lobe 32 may have one or more points of impact 50, 52 formed along the spoke defined by the second lobe 32. The points of impact for a single lobe, such as the points of impact 46, 48 for the first lobe 50 and the points of impact 50, 52 for the second lobe 32 may be formed along a same radial axis extending from the central axis of rotation 24. Points of impact along any spoke of the radial distance relative to the central axis of rotation 24 may be configured to provide a same scanning angle. Each of the points of impact 46, 48, 50, 52 is configured to emit and/or receive light in multiple directions D1, D2, D3. The light may be emitted and/or received over multiple paths simultaneously.

FIG. 4 shows a first scanning region 54 in which the points of impact 46, 48 receive light from an emitter 56 and reflect or emit light in three different directions D1, D2, D3. The directions D1, D2, D3 correspond to the same point of impact 46. Three different directions correspond to the point of impact 48. At each point of impact 46, 48, the light may be emitted in fewer than three directions or more than three directions. Accordingly, as the wave scanning optic 20 rotates around the central axis of rotation 24, or spins, the angular reflectance or refraction at the points of impact 46, 48 are able to produce a uniform line scan, without breaks in the scan pattern. As also shown in FIG. 4, the optical surface 28 may simultaneously receive light from a second scanning region 58 at the points of impact 50, 52 in multiple different directions. Each of the points of impact 50, 52 may emit the light to a receiver 59. Thus, the wave scanning optic 20 may be used as a receiver and/or an emitter.

FIG. 5 shows exemplary angles for the scanning or incident directions D1, D2, D3 for the optical surface 28. For example, D1 may correspond to a horizontal scan angle. D2 may correspond to a vertical scan angle that is 90 degrees relative to the horizontal scan angle, and D3 may correspond to a diagonal scan that is between the horizontal scan angle and the vertical scan angle, i.e. between zero and 90 degrees. The scan angles may correspond to the scanning or incident directions D1, D2, D3 for the light emitted from the points of impact 46, 48 to the first scanning region 54 shown in FIG. 4. FIG. 5 also shows the receiving path R1 for light received at the points of impact 50, 52, such as from the second scanning region 58. If the wave scanning optic 20 has a wavy pattern on both surfaces 26, 28, light may be emitted and/or received in different directions.

The wave scanning optic 20 described herein is advantageous as compared with conventional mirrors that include polygonal shapes or facets. In contrast to the conventional mirrors, the wave scanning optic 20 provides the same scanning angles in the radial direction relative to the central axis of rotation 24 such that the wave scanning optic 20 provides continuous multidirectional scanning with uniform lines. This configuration eliminates possible pyramidal errors or facet angle errors that are caused by different angles between facets around the scan in a polygonal or faceted mirror.

Still another advantage of the wave scanning optic 20 is that the wave scanning optic 20 is formed as a compact, single optical structure that may be rotated at high speeds without breaks in the scan pattern. In contrast, conventional mirrors require a reset period between scanning periods caused by rotating the optic back to a start point or during a change of direction of the optic during a multidirectional scan. The speed of the scan may be increased by either increasing the speed of rotation of the wave scanning optic 20, or by increasing the number of lobes 30, 32 formed on the optical surface 28. Accordingly, a desired scan rate for a particular application may be achieved based on the formation of the optical surface 28.

Figure 6:
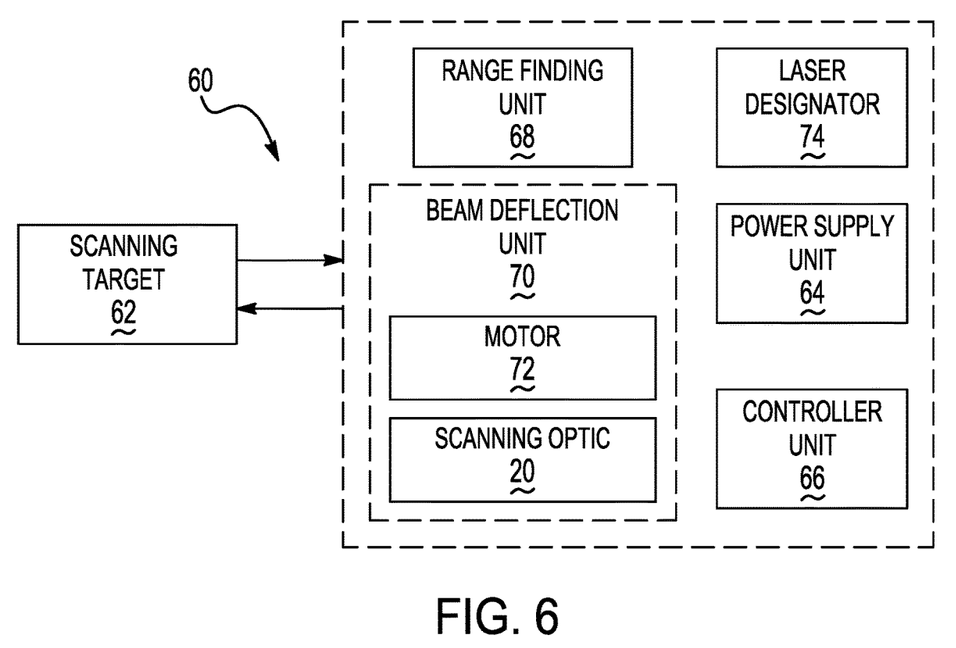
FIG. 6 shows a light or laser detection and ranging system implementing the wave scanning optic of FIG. 1.

FIG. 6 shows an exemplary application in which the wave scanning optic 20 is implemented in a LIDAR or LADAR system 60 for a target 62, such as for airborne laser scanning. The LIDAR/LADAR system 60 may be used to illuminate the target 62 with a laser light and measure the reflected light with a sensor. The target 62 may be dependent on the application. The LIDAR/LADAR system 60 may include any suitable power supply unit 64, a controller unit 66, a range finding unit 68, and a beam deflection unit 70 including the wave scanning optic 20. A function for the power supply unit 64 includes supplying power to any suitable motor 72 having a shaft that is coupled to the wave scanning optic 20 for rotating the wave scanning optic 20. The wave scanning optic 20 may be rotated continuously during operation of the LIDAR/LADAR system 60.

In exemplary applications, the LIDAR/LADAR system 60 may include a laser light source or designator 74 configured to designate the target 62. The designator 74 and other components of the LIDAR/LADAR system 60 may be arranged on any suitable platform, such as an aircraft, ground vehicle, naval vessel, or stationary platform. The light source is used to direct light at the wave scanning optic 20 which reflects the light. Using the wave scanning optic 20 is advantageous in tracking the path of the designator 74, e.g. via simultaneously emitting and receiving light, such that the wave scanning optic 20 may collect light with a lower power source. In addition to the wave scanning optic 20, the beam deflection unit 70 may include any other suitable optical components, such as additional mirrors, transmissive elements including lenses or filters, beam splitters, manipulators, collimators, focusing elements, or expanders.

Using the wave scanning optic 20 in the LIDAR/LADAR system 60 is advantageous in that laser energy may be scanned over a large area. Multiple light paths can use the same optical component, i.e. the wave scanning optic 20. Fast multidirectional scanning is also enabled which is particularly advantageous for a LIDAR/LADAR system 60 which may require faster scanning as compared with other applications. Other hyperspectral line scanning applications and many other applications may also implement the wave scanning optic 20.

Figure 7:
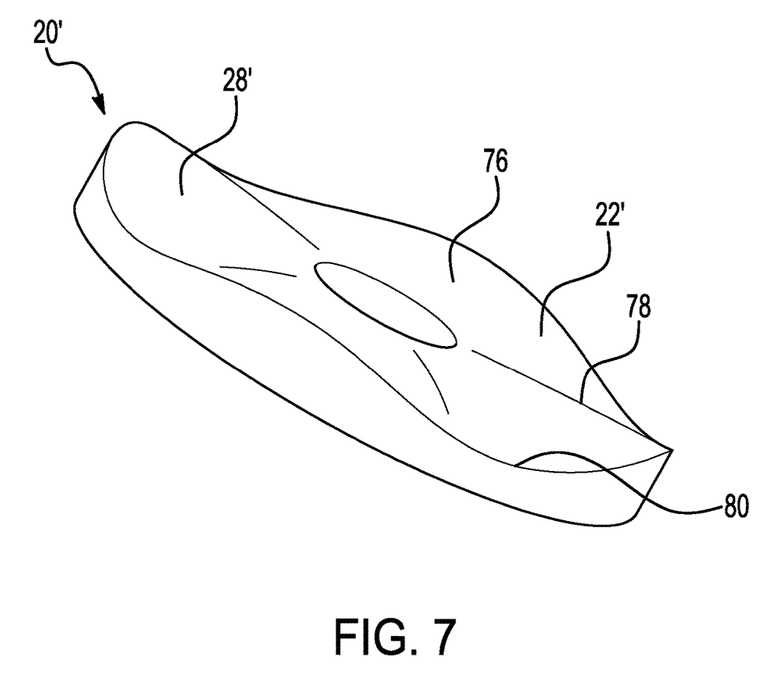
FIG. 7 shows a wave scanning optic according to another exemplary embodiment of the present disclosure in which the lobes have shorter peaks.

FIG. 7 shows another exemplary embodiment of the wave scanning optic 20' in accordance with the present disclosure in which the wave scanning optic 20' has a thickness that is less than the thickness of the wave scanning optic 20' of FIG. 1. The wave scanning optic 20' has lobes 76 formed on the optical surface 28' that are flatter as compared with the lobes 30, 32 of the wave scanning optic 20. For example, a height between the peak 78 and valley 80 of the lobe 76 may be less than that of the height of the lobes 30, 32 of the wave scanning optic 20, such that the wave scanning optic 20' has an amplitude that is less than an amplitude of the wave scanning optic 20.

The wave scanning optic 20' is shown as having four lobes 76, but more than four lobes 76 or fewer than four lobes 76 may be provided. Although both wave scanning optics 20, 20' have the same number of lobes, the scan angles provided by the wave scanning optic 20' will be different than the scan angles provided by the wave scanning optic 20 due to the lower amplitude of the lobes 76 of the wave scanning optic 20' as compared with the lobes 30, 32 of the wave scanning optic 20. The flatter lobes 76 for the wave scanning optic 20' may be advantageous in providing more control of the scanning operation.

Figure 8:
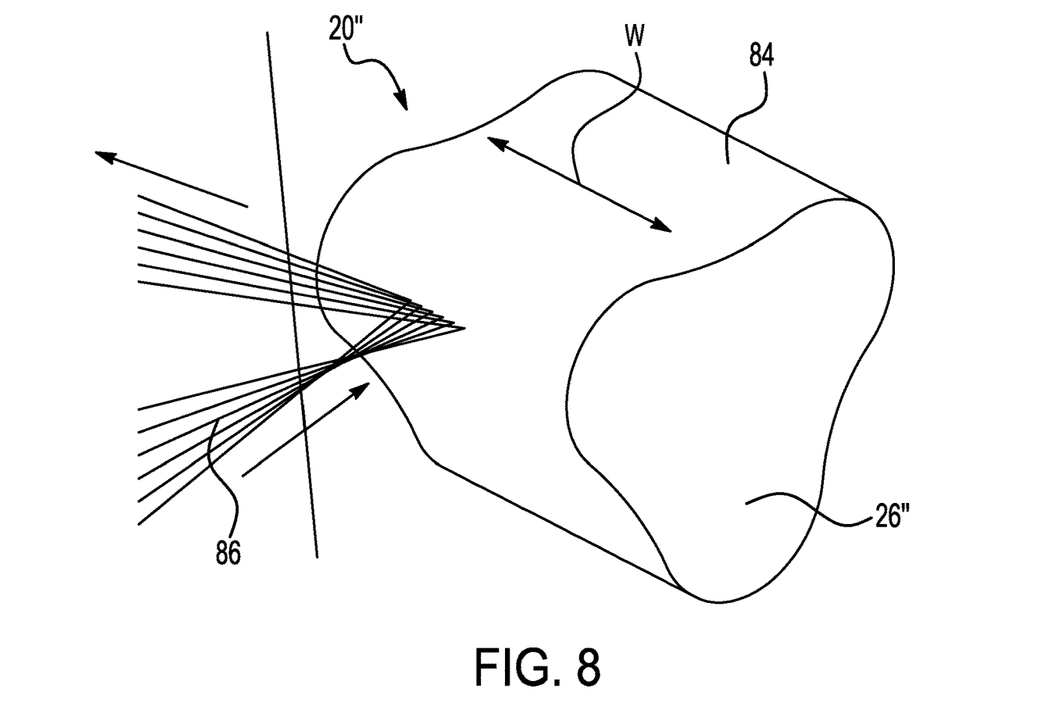
FIG. 8 shows a wave scanning optic according to still another exemplary embodiment of the present disclosure in which the wave scanning optic is formed of a cylindrical body.
Figure 9:
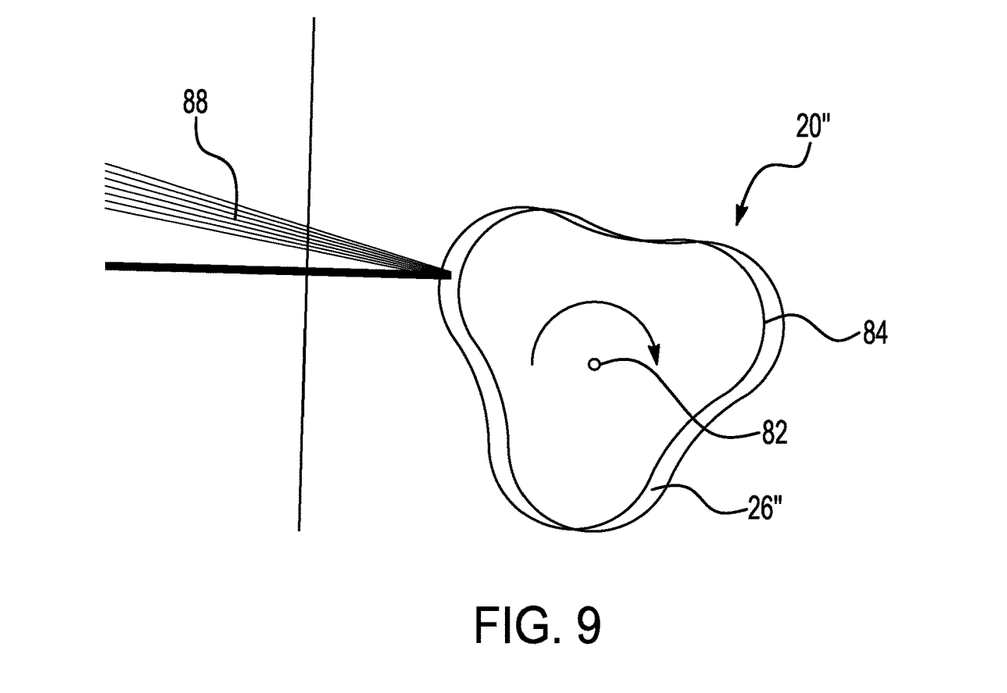
FIG. 9 shows the incident beams provided during rotation of the wave scanning optic of FIG. 8.

FIGS. 8 and 9 shows still another exemplary embodiment of the wave scanning optic 20" in which the wave scanning optic 20" is cylindrical in shape as compared with the disc-shaped wave scanning optics 20, 20'. The wave scanning optic 20" is rotatable about a central axis of rotation 82 and includes an optical surface 28" that includes one or more lobes 84. FIGS. 8 and 9 show the optical surface 28 having three lobes 84 but fewer than three lobes or more than three lobes may be provided. The optical surface 28" forms a continuous and closed surface that surrounds the central axis of rotation 82.

A width w of the optical surface 28" extends parallel with the central axis of rotation 82. The width w may be constant along the entire perimeter of the wave scanning optic 20" around the central axis of rotation 82 and a radial distance between the central axis of rotation 82 and points along the optical surface 28" varies along the optical surface 28". The optical surface 28" of the wave scanning optic 20" may be advantageous in providing a bi-directional scan and a higher intensity scanning beam.

As shown in FIG. 8, the optical surface 28" may be configured to receive an input beam 86 that is divergent in a horizontal direction. The optical surface 28" may be configured to provide an incident beam that is a line in an x-direction and divergent in a y-direction. As shown in FIG. 9, the incident beam 88 may be collimated in a vertical direction and divergent in a direction that is normal to the rotational plane of the wave scanning optic 20" about the central axis of rotation 82. During a constant rotation of the wave scanning optic 20", the optical surface 28" may be configured to provide a range of repeating bi-directional scan line beams from a beam that is incident on the optical surface 28".

Figure 10:
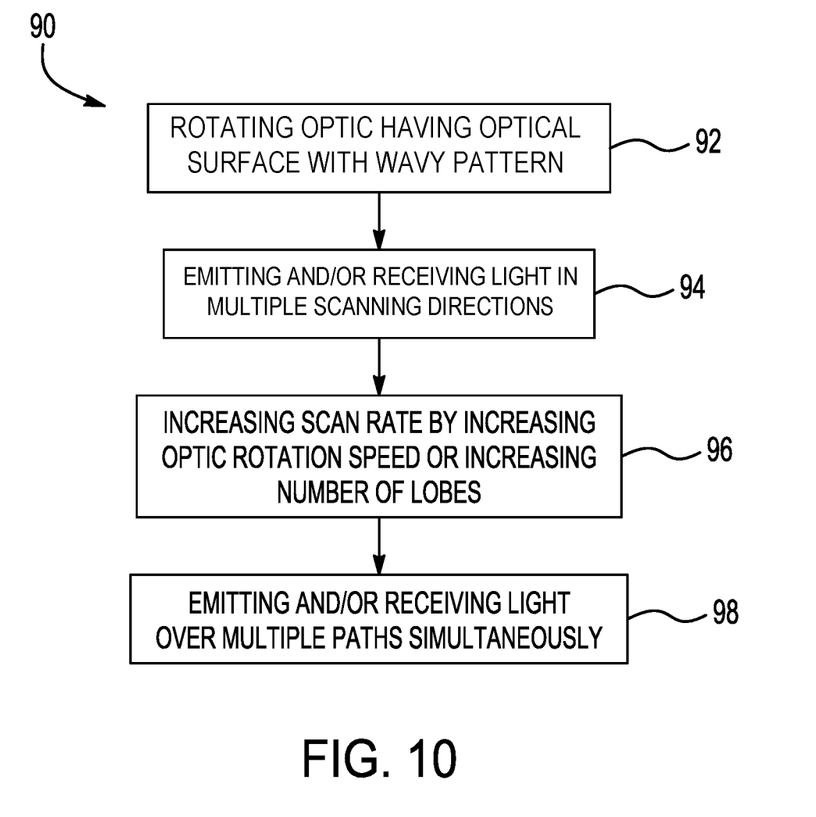
FIG. 10 shows a flowchart for a method of scanning using a wave scanning optic, such as the wave scanning optic shown in FIGS. 1-9.

Referring now to FIG. 10, a method 90 of scanning is shown. The method 90 may include using the wave scanning optic 20, 20', 20" shown in FIGS. 1-9. Step 92 of the method 90 includes rotating the wave scanning optic 20, 20', 20" about a central axis of rotation 24. The wave scanning optic 20, 20', 20" has an optical surface 28, 28', 28" formed thereon that has a wavy pattern with one or more lobes that protrude outwardly from the optical surface 28, 28', 28".

Step 92 of the method 90 may include providing a uniform line scan during rotation of the wave scanning optic 20, 20', 20" via an angular reflectance or refraction of the optical surface 28, 28', 28".

Step 94 of the method 90 includes emitting and/or receiving light in multiple incident directions. Step 96 of the method 90 may include increasing a scan rate of the wave scanning optic 20, 20', 20" by either increasing a speed of rotation of the wave scanning optic 20, 20', 20" or by increasing a number of the lobes. Step 98 of the method 90 includes emitting and/or receiving light over multiple paths simultaneously.

Although the disclosure shows and describes certain preferred embodiment or embodiments, it is obvious that equivalent alterations and modifications will occur to others skilled in the art upon the reading and understanding of this specification and the annexed drawings. In particular regard to the various functions performed by the above described elements (external components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the disclosure. In addition, while a particular feature of the disclosure may have been described above with respect to only one or more of several illustrated embodiments, such feature may be combined with one or more other features of the other embodiments, as may be desired and advantageous for any given or particular application.

What is claimed is:

1. A scanning optic comprising:
   a rotatable body defining a central axis of rotation about which the rotatable body rotates during scanning; and
   an optical surface formed on the rotatable body and having a wavy pattern defined by one or more lobes that protrude outwardly from the rotatable body.

2. The scanning optic according to claim 1, wherein the optical surface has a continuous sinusoidal pattern with an angular frequency that varies along a radial distance from the central axis of rotation.

3. The scanning optic according to claim 1, wherein the optical surface is configured to emit and/or receive light in one or more incident directions.

4. The scanning optic according to claim 3, wherein the one or more incident directions correspond to points of impact of light that is emitted from or received on the optical surface as the rotatable body rotates during scanning.

5. The scanning optic according to claim 4, wherein points of impact along any spoke of radial distance relative to the central axis of rotation are configured to provide a same scanning angle.

6. The scanning optic according to claim 3, wherein the optical surface is configured to emit and/or receive light over multiple paths simultaneously.

7. The scanning optic according to claim 3, wherein the one or more incident directions include a horizontal direction, a vertical direction, and a diagonal direction between the horizontal direction and the vertical direction.

8. The scanning optic according to claim 3, wherein the optical surface is configured to both emit and receive light.

9. The scanning optic according to claim 1, wherein an angular reflectance or refraction of the optical surface provides a uniform line scan during rotation of the rotatable body.

10. The scanning optic according to claim 1, wherein the continuous pattern is periodic or aperiodic.

11. The scanning optic according to claim 1, wherein the rotatable body has a washer shape.

12. The scanning optic according to claim 1, wherein the rotatable body is cylindrical in shape.

13. The scanning optic according to claim 1, wherein the one or more lobes includes a plurality of lobes.

14. The scanning optic according to claim 1, wherein the scanning optic is formed of a plurality of scanned refractive optical surfaces.

15. The scanning optic according to claim 1, wherein the scanning optic is arranged in a laser radar.

16. A laser radar comprising:
   a rotatable optic defining a central axis of rotation about which the rotatable optic rotates during scanning; and
   an optical surface formed on the rotatable optic and having a wavy pattern with one or more lobes that protrude outwardly from the rotatable optic, the optical surface being configured to emit and/or receive light in one or more incident directions, and the optical surface having an angular reflectance or refraction that provides a uniform line scan during rotation of the rotatable optic.

17. A method of scanning, the method comprising:
   rotating a rotatable optic about a central axis of rotation, the rotatable optic having an optical surface formed thereon that has a wavy pattern with one or more lobes that protrude outwardly from the rotatable optic; and
   emitting and/or receiving light in one or more incident directions.

18. The method of claim 17 further comprising increasing a scan rate of the rotatable optic by at least one of increasing a number of the one or more lobes or increasing a speed of rotation of the rotatable optic.

19. The method of claim 17 further comprising emitting and/or receiving light over multiple paths simultaneously.

20. The method of claim 17 further comprising providing a uniform line scan during rotation of the rotatable optic via an angular reflectance or refraction of the optical surface.

* * * * *